US011243881B2

(12) United States Patent
Wang et al.

(10) Patent No.: US 11,243,881 B2
(45) Date of Patent: Feb. 8, 2022

(54) PRACTICAL ORAM DELEGATION FOR UNTRUSTED MEMORY ON CLOUD SERVERS

(71) Applicant: University of Pittsburgh-Of the Commonwealth System of Higher Education, Pittsburgh, PA (US)

(72) Inventors: Rujia Wang, Chicago, IL (US); Jun Yang, Pittsburgh, PA (US); YouTao Zhang, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 144 days.

(21) Appl. No.: 16/526,108

(22) Filed: Jul. 30, 2019

(65) Prior Publication Data
US 2020/0042442 A1 Feb. 6, 2020

Related U.S. Application Data

(60) Provisional application No. 62/714,138, filed on Aug. 3, 2018.

(51) Int. Cl.
*G06F 12/06* (2006.01)
*G06F 12/0815* (2016.01)
(Continued)

(52) U.S. Cl.
CPC ........ *G06F 12/0638* (2013.01); *G06F 9/5016* (2013.01); *G06F 12/0815* (2013.01);
(Continued)

(58) Field of Classification Search
CPC ............ G06F 12/0638; G06F 12/0815; G06F 12/1408; G06F 13/1673; G06F 2212/1021;
(Continued)

(56) References Cited

U.S. PATENT DOCUMENTS

8,909,967 B1 * 12/2014 van Dijk ................... H04L 9/06
713/330
2009/0327596 A1 * 12/2009 Christenson ........ G06F 13/1684
711/105
(Continued)

*Primary Examiner* — Zhuo H Li
(74) *Attorney, Agent, or Firm* — Philip E. Levy; Eckert Seamans Cherin & Mellott, LLC (57) ABSTRACT

An apparatus including (i) a processor including a plurality of main buffer on board (BOB) memory controllers (MCs) and a secure engine, (ii) a plurality of simple BOB MCs, (iii) a secure delegator, and (iv) a plurality of memory modules. The secure delegator coupled to a first main BOB MC and a first simple BOB MC creates a secure channel. A second main BOB MC coupled to a second simple BOB MC creates a non-secure channel. The plurality of main BOB MCs, the secure engine and the secure delegator are provided within a trusted computing base (TCB) of the apparatus and the plurality of simple BOB MCs and the plurality of memory modules are provided outside the TCB. The secure delegator is configured to: (i) secure communication between the first main BOB MC and the secure delegator, and (ii) perform Path ORAM accesses to the plurality of memory modules.

15 Claims, 5 Drawing Sheets

(51) Int. Cl.
*G06F 13/16* (2006.01)
*G06F 9/50* (2006.01)
*G06F 12/14* (2006.01)

(52) U.S. Cl.
CPC ...... *G06F 12/1408* (2013.01); *G06F 13/1673* (2013.01); *G06F 2212/1021* (2013.01)

(58) Field of Classification Search
CPC .............. G06F 9/5016; G06F 12/0284; G06F 12/1433; G06F 21/606; G06F 21/6218; G06F 21/78; G06F 2212/1024; G06F 2212/1052
See application file for complete search history.

(56) References Cited

U.S. PATENT DOCUMENTS

2018/0157612 A1* 6/2018 Chen .................. G06F 13/4027
2020/0328889 A1* 10/2020 Matetic ................ H04L 9/3236

* cited by examiner

PRACTICAL ORAM DELEGATION FOR UNTRUSTED MEMORY ON CLOUD SERVERS

CROSS-REFERENCE TO RELATED APPLICATION

This patent application claims the priority benefit under 35 U.S.C. § 119(e) of U.S. Provisional Application No. 62/714,138, filed on Aug. 3, 2018, the contents of which are herein incorporated by reference

GOVERNMENT CONTRACT

This invention was made with government support under grant numbers 1718080 and 1617071 awarded by the National Science Foundation (NSF). The government has certain rights in the invention.

BACKGROUND OF THE INVENTION

1. Field of the Invention

The present invention relates to an apparatus, in particular, to a dynamic oblivious memory apparatus for use with untrusted memory, such as cloud servers with untrusted memory, that employs a buffer-on-board (BOB) architecture wherein the trusted computing base (TCB) consists of a processor and a secure delegator embedded in an off-the processor BOB main controller that offloads the expensive Path ORAM primitives from the processor.

2. Description of the Related Art

Cloud computing has become a ubiquitous computing paradigm nowadays. In order to maximize hardware resource utilization and reduce energy consumption, cloud providers widely adopt server consolidation to share the same hardware resources among multiple co-running applications. However, such an execution model raises security concerns. On the one hand, a curious or malicious server may monitor the execution, e.g., by attaching physical devices to eavesdrop on the memory communication. On the other hand, a co-running application may extract sensitive information through covert communication channels. To facilitate security analysis, the memory components of a cloud server may be partitioned into those that are trustworthy, i.e., the trusted computing base (TCB), and those that are not trustworthy. That is, the TCB of a computer device may be a set of all hardware, firmware, and/or software components on which the security of the device depends such that any vulnerabilities occurring inside the TCB may jeopardize the security of the entire device while the untrustworthy part may misbehave without affecting the security of the device. A memory device may be secure if all attacks from outside of the TCB can be successfully defended.

To ensure high-level security protection, various mechanisms integrating security engines in the processor have been introduced. Intel. Software Guard Extensions (SGX) isolates the code and data of private enclave functions from the rest of the system. An XOM (execution only memory) model includes the processor as the only hardware component in the TCB. A secure memory model includes a processor and a main memory module in the TCB. However, each of these models faces challenges that still expose the memory accesses via these models to attackers. For example, the XOM model saves encrypted data and code in the untrusted memory, and to access data saved in the untrusted memory, the on-chip memory controller needs to convert a read or write request to a sequence of device commands. Since the memory module is not trustworthy, these device commands and the memory addresses are sent in cleartext. Even though the data exchanged between the processor and the untrustworthy memory modules are encrypted, the access pattern of memory addresses may leak sensitive information. For example, even when both code and data are unknown to an attacker, a control flow graph (CFG) fingerprinting technique may identify known pieces of code solely based on the address trace. To alleviate such data leakage in the XOM model, oblivious random access memory (ORAM) (e.g., implementing Path ORAM) may be used to protect data privacy on untrusted memory by reshuffling memory data after each memory access. Path ORAM is a tree based ORAM protocol, and maintains a position map using a recursive ORAM. However, ORAM may introduce a large memory contention and performance degradation. For example, a Path ORAM implementing an ORAM architecture may convert one memory access to hundreds of memory accesses, thereby creating an extreme memory intensity.

The secure memory model, e.g., ObfusMem, InvisiMem. etc., alleviates these problems of Path ORAM by placing both the processor and the main memory module in the TCB. Thus, there is no need for Path ORAM protection for the secure memory model. However, the secure memory model protects data privacy through communication channel encryption, which may require a secure integration of cryptographic logic and memory devices, and such integration (e.g., adding a secure (bridge) chip to a DRAM DIMMs) may not meet the secure memory model requirement as the wires on the printed circuit board (PCB) may be compromised for eavesdropping. In such cases, a secure engine may be placed in a logical layer of a hyper memory cube (HMC), but HMC may face fabrication challenges on module capacity and yield. Further, the mainstream computing servers still widely adopt traditional untrusted DRAM modules, which adopt a direct-attached memory architecture. That is, one memory channel connects to one or more DRAM DIMMs, a channel bus includes address, data, and command buses, and an on-chip memory controller (MC) is integrated on the processor. To summarize, it is important to devise low interference privacy protection schemes for cloud servers with untrusted memory.

SUMMARY OF THE INVENTION

Accordingly, it is an object of the present disclosure to provide a novel secure execution model, referred to as D-ORAM, that is compatible with mainstream server memory architectures, and prevents information leakage from memory accesses to untrusted memory. In D-ORAM, a trusted computing base (TCB) consists of a processor and a small off-the processor secure device, referred to herein as a secure delegator. The secure delegator protects the communication between the processor and itself by using encryption, and protects the communication between itself and memory modules arranged outside of the TCB by using Path ORAM. More specifically, the secure delegator performs one-time-pad encryption for protection of communication between the processor and itself, and delegates Path ORAM, leveraging a buffer on board (BOB) architecture such that the D-ORAM may be integrated into a memory device using commercially available untrusted memory modules, without having to redesign the memory device. A BOB architecture may be a memory architecture in which memory buffers are placed between the processor and the memory modules. Thus, D-ORAM achieves high-level security protection, high system resource utilization, low interference between secure and non-secure applications, and good compatibility with mainstream server hardware.

These objects are achieved according to embodiment of the present disclosure by providing an apparatus that may include a processor including a plurality of main BOB memory controllers (MCs) and a secure engine coupled to a first BOB MC of the plurality of main BOB MCs, a plurality of simple BOB MCs where a first simple BOB MC of the plurality of simple BOB MCs is coupled to the first main BOB MC by a first serial link and a second simple BOB MC of the plurality of simple BOB MCs is coupled to a second main BOB MC of the plurality of main BOB MCs via a second serial link, a secure delegator arranged between the processor and the first simple BOB MC and electrically coupled to the first main BOB MC and the first simple BOB MC, where the secure delegator, the first main BOB MC and the secure engine create a secure channel, and the second simple BOB MC and the second main BOB MC create a non-secure channel, and a plurality of memory modules coupled to each of the plurality of simple BOB MCs by a parallel link, where the plurality of main BOB MCs, the secure engine and the secure delegator are provided within a trusted computing base (TCB) of the apparatus and the plurality of simple BOB MCs and the plurality of memory modules are provided outside the TCB, and where the secure engine is structured and configured to facilitate cryptographic operations, and the secure delegator is structured and configured to: (i) secure communication between the plurality of main BOB MCs and the secure delegator, and (ii) perform Path ORAM accesses to the memory modules.

In some examples, the secure engine may be further structured and configured to receive Path ORAM primitives and reduce contention for access to one or more memory buses outside of the TCB.

In some examples, the plurality of simple BOB MCs each may include control logic and data buffers.

In some examples, the secure delegator may be further structured and configured to receive a memory access request from the first main BOB MC, the memory access request including a request for missed data during communications, access data saved in one or more memory modules of the plurality the memory modules based at least in part on a Path ORAM protocol, and prepare a response packet including the missed data for transmission to the first main BOB MC. The memory access request may include at least one of a real memory access request and a dummy memory access request comprising one or more zero bits. The secure delegator may be also structured and configured to convert the memory access request to a plurality of memory accesses on a Path ORAM tree, and delegate the Path ORAM tree across the secure channel and the non-secure channel. The secure delegator may be also structured and configured to consult a position map to locate a first path along which the missed data is saved, read all data blocks from the first path, remap a data block including the missed data to a second path, save the remapped data block in a stash, reencrypt other data blocks along the second path, and write at least one of the other blocks and the remapped data block back to the plurality of memory modules. The secured delegator may be further structured and configured to balance a space demand for the secure channel by reallocating the plurality of memory accesses to a last level of a Path ORAM tree node set for the secure channel to the non-secure channel.

In some examples, the secure engine may be further structured and configured to generate a Path ORAM request after a predetermined period starting at a time of receipt of a memory access request from the first main BOB MC.

In some examples, the secure engine may be further structured and configured to negotiate with the secure delegator at least one of a secret key and a nounce based at least in part on a public key infrastructure. In some examples, the secure engine may be further structured and configured to encrypt a memory access request based at least in part on one-time-pad (OTP) encryption.

In some examples, the first main BOB MC may be structured and configured to trigger the secure delegator by transmitting a memory access request to the secure delegator based at least in part on a determination that a cache miss has occurred during communications.

In some examples, the plurality of simple BOB MCs each may be structured and configured to generate and transmit device commands and enforce timing constraints for the apparatus.

In some examples, the parallel link may include an address bus and a command bus that are structured and configured to transmit cleartext data.

In some example, the processor is a processor chip and the plurality of simple BOB MCs are provided on a motherboard coupled to the processor chip. In some examples, the parallel link may include an address bus and a command bus that are structured and configured to transmit cleartext data.

In some examples, the processor is a processor chip, and the plurality of simple BOB MCs may be provided on a motherboard coupled to the processor chip.

In another embodiment, a method for providing secure communications is provided. The method may include triggering a secure delegator of an apparatus by transmitting a memory access request based at least in part on a determination that a cache miss has occurred during communications, where the memory access request includes a request for missed data, accessing by the secure delegator data saved in one or more unsecure memory modules based at least in part on a Path ORAM protocol, preparing by the secure delegator a response packet including the missed data, and obtaining the response packet from the secure delegator.

In some examples, accessing by the secure delegator data saved in one or more unsecure memory modules may include converting the memory access request to a plurality of memory accesses on a Path ORAM tree, and delegating the Path ORAM tree across memory channels including a secure channel and one or more non-secure channels of the apparatus. Delegating the Path ORAM tree may include balancing a space demand for the secure channel by reallocating the plurality of memory accesses to a last level of a Path ORAM tree node set for the secure channel to the one or more non-secure channels. In some examples, the method may further include consulting by the secure delegator a position map to locate a first path along which the missed data is saved, reading by the secure delegator all data blocks from the first path, remapping by the secure delegator a data block including the missed data to a second path, saving by the secure delegator the remapped data block in a stash, reencrypting by the secure delegator other data blocks along the second path, and writing by the secure delegator at least one of the other blocks and the remapped data bock back to the unsecure memory modules.

In some examples, the method may further include receiving Path GRAM primitives, and reducing connection for access to one or more memory buses outside of a trusted computing base.

In some examples, the method may further include negotiating at least one of a secret key and a nounce based at least in part on a public key infrastructure.

In some examples, the method may further include encrypting the memory access request based at least in part on OTP encryption.

In some examples, the method may further include performing authentication and integrity check.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION OF EXEMPLARY EMBODIMENTS

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, "directly coupled" means that two elements are directly in contact with each other.

As used herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As described in greater detail herein in connection with various particular embodiments, the disclosed concept provides a novel oblivious memory apparatus, referred to as D-ORAM, for cloud servers with untrusted memory. The D-ORAM includes a processor and a small off-the processor secure component, referred to herein as a secure delegator, in a trusted computing base (TCB). The secure delegator protects communications between the processor and the secure delegator by using encryption, e.g., one-time-pad encryption, and communications between the secure delegator and untrusted memory modules, e.g., DIMMs, by using Path ORAM. The Path ORAM is delegated in the secure delegator. More specifically, the D-ORAM leverages a BOB architecture such that unsecure communication over the untrusted memory modules is protected by Path ORAM, and the D-ORAM may be integrated into memory devices using commercially available untrusted memory modules without having to redesign the memory devices. The secure delegator offloads the expensive Path ORAM primitives from the processor, thereby effectively mitigating an extreme memory contention at an on-the-processor memory controller. Hence, the precious processor resources can be better exploited by co-running applications. Therefore, the D-ORAM achieves a good tradeoff among high-level security protection, low execution interference, and good compatibility with existing server architecture.

The disclosed concept will now be described, for purposes of explanation, in connection with numerous specific details in order to provide a thorough understanding of the subject innovation. It will be evident, however, that the disclosed concept can be practiced without these specific details without departing from the spirit and scope of this innovation.

Figure 1:
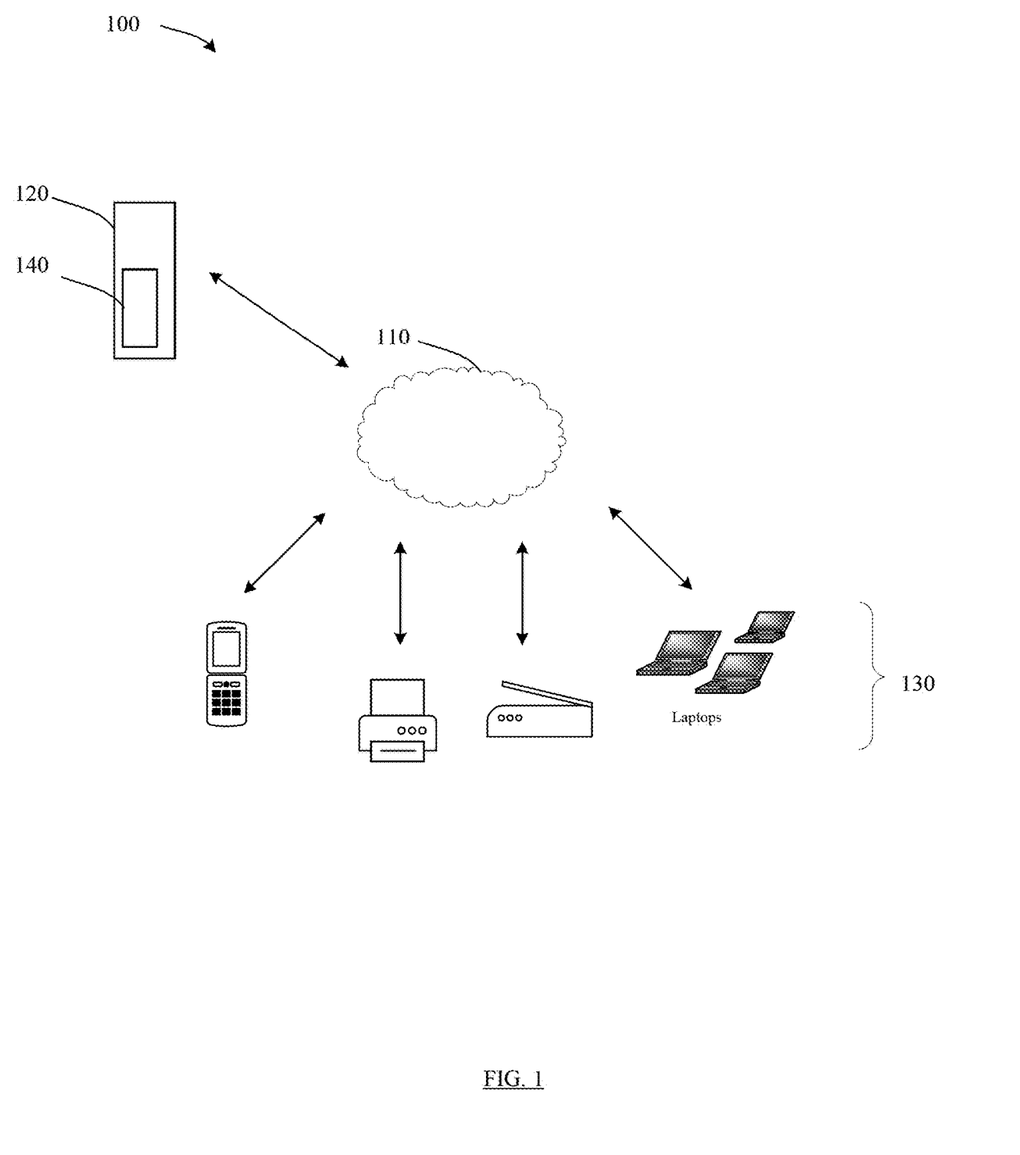
FIG. 1 is a schematic diagram showing an example cloud network system according to one particular, non-limiting exemplary embodiment of the disclosed concept.

FIG. 1 is a diagram showing an example cloud network system 100 according to one particular, non-limiting exemplary embodiment of the disclosed concept. The cloud network system 100 displays a cloud network 110, a server 120, and user devices, e.g., a mobile cellular phone, a printer, a scanner, lap top computers, etc., 130, all interacting with one another within the cloud network system 100. The server 120 may include D-ORAM 140 in accordance with the present disclosure. While FIG. 1 shows D-ORAM 140 in the server 120 only, D-ORAM 140 may be integrated in any devices which may perform data access and/or storage application using untrusted memory. The server 120 may be part of a group of servers providing, e.g., the applications and operations by the D-ORAM 140. Additionally or alternatively, the server 120 may be independent and provide a variety of services, including the Path ORAM primitives in accordance with the present disclosure to end users 130 or other applications and servers, or may be local or remote servers.

Figure 2:
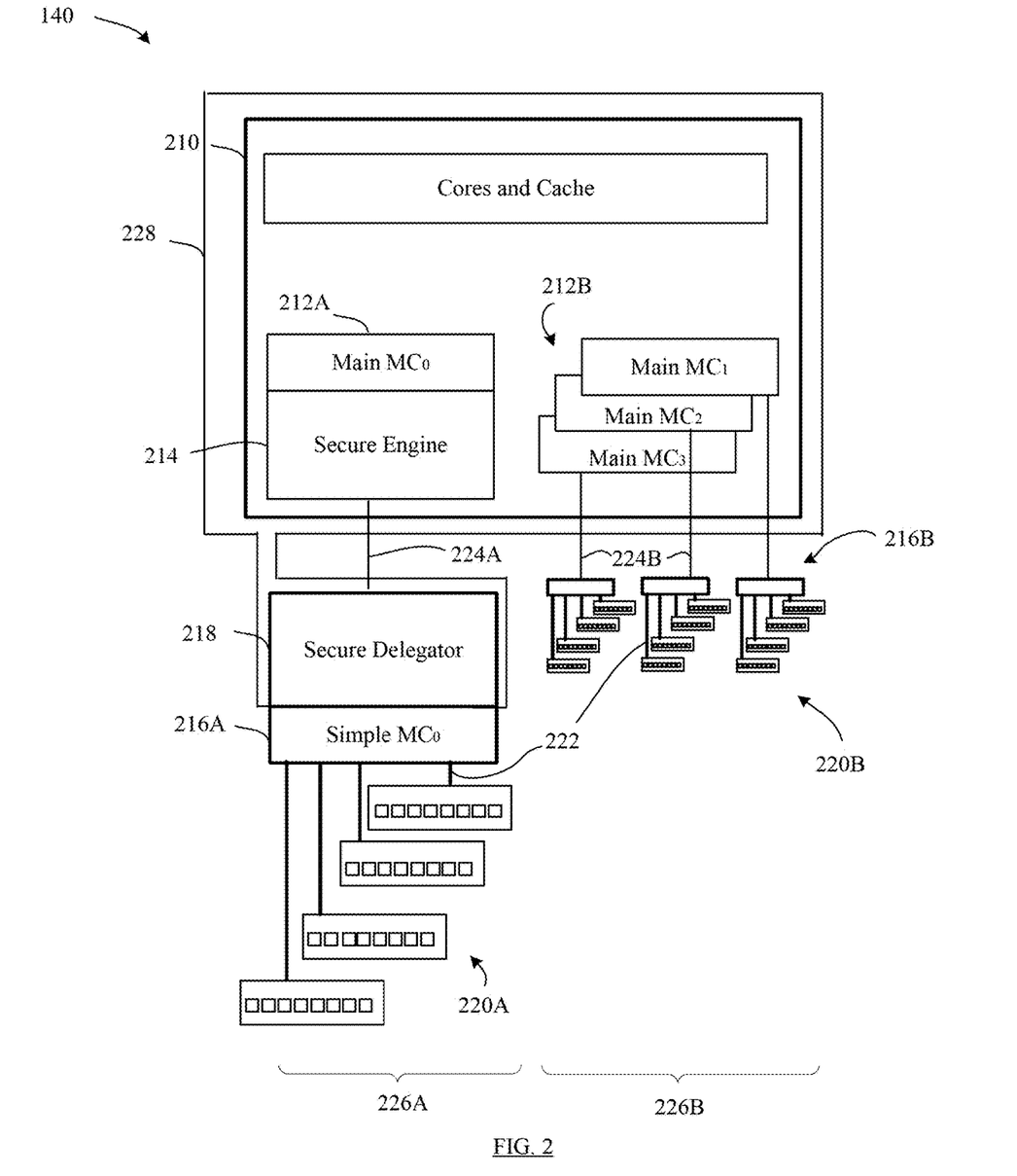
FIG. 2 is a schematic diagram of a D-ORAM device according to one particular, non-limiting exemplary embodiment, including the various components housed therein.

FIG. 2 is a schematic diagram of D-ORAM 140 according to one particular, non-limiting exemplary embodiment, including the various components housed therein. The D-ORAM 140 may be a server, a master server, a remote server, a local server, a memory device, or any other device performing data access and/or storage application. The D-ORAM 140 includes a processor 210 including (i) a plurality of main buffer on board (BOB) memory controllers (MCs) 212A and 212B and a secure engine 214, e.g., HW, SW, or HW/SW codesigned security component. (ii) a plurality of simple BOB MCs 216A and 216B, (iii) a secure delegator 218, and (iv) a plurality of memory modules 220A and 220B coupled to each of the plurality of simple BOB MCs 216A and 216B by a parallel link 222. The processor 210 may be an 8-core chip multiprocessor, controlling the applications and operations of components in the D-ORAM 140. The plurality of main BOB MCs include a first main BOB MC 212A and a second main BOB MC 212B, coupled to a first simple BOB MC 216A and a second simple BOB MC 216B, respectively, where the simple BOB MCs 216A and 216B each transmit device commands and enforce timing constraints, e.g., as specified in Joint Electron Device Engineering Council (JEDEC) standard.

The first main BOB MC 212A is coupled to the secure engine 214 within the processor 210, the secure delegator 218, and the first simple BOB MC 216A via a first serial link 224A. The first main BOB MC 212A, the secure engine 214, and the secure delegator 218 create a secure channel 226A. The first main BOB MC 212A may trigger the operation of the secure delegator 218 by transmitting a memory access request (including a request for a missed data) to the secure delegator 218 based on a determination that a cache miss has occurred. The first main BOB MC 212A may also obtain a response packet including the missed data prepared by the secure delegator 218 from the first simple BOB MC 216A. The secure engine 214 may facilitate cryptographic operations, e.g., encrypting the memory access request with one-time-pad (OTP) encryption and negotiating with the secure delegator 218 a secret key and/or a nounce using public key infrastructure. The secure engine 214 may decrypt the response packet obtained from the secure delegator 218.

The second main BOB MC 212B and the second simple BOB MC 216B each may include a plurality of main BOB MCs, e.g., main BOB $MC_1$, main BOB $MC_2$, and main BOB $MC_3$, and simple BOB MCs, e.g., simple BOB $MC_1$, simple BOB $MC_2$, and simple BOB $MC_3$, respectively. The main BOB $MC_1$, main BOB $MC_2$, and main BOB $MC_3$ are coupled to the simple BOB $MC_1$, simple BOB $MC_2$, and simple BOB $MC_3$, respectively, via respective second serial links 224B. In some cases, a peak bandwidth of one serial link channel is set to be comparable with that of one parallel link channel. The second main BOB MC 212B together with the first main BOB MC 212A, the secure engine 214, and the secure delegator 218 form a trusted computing base (TCB) 228. However, the second main BOB MC 212B coupled to the second simple BOB MC 2161B form non-secure channels 226B. Further, none of the simple BOB MCs 216A and 216B are included in the TCB 228. As such, control logic and data buffers included in the simple BOB MCs 216A and 216B also fall outside of the TCB 228, and each simple BOB MC may control at least one non-secure sub-channels, e.g., four sub-channels.

The secure delegator 218 may be arranged off the processor 210 and between the processor 210 and the first simple BOB MC 216A. The secure delegator 218 secures communication between the first main BOB MC 212A and the secure delegator 218, and performs Path ORAM accesses to the plurality of memory modules 220A and 220B. Thus, the secure delegator 218 not only accelerates cryptographic operations, but also enforces Path ORAM protocols. For example, the secure delegator 218 negotiates with the secure engine 214 a secret key and a nounce for a memory access request using the public key infrastructure, and decrypts, authenticates and integrity checks the memory access request. The secure delegator 218 may also encrypt a response packet and adds authentication and integrity check bits to the response packet for transmission of the response packet to the first main BOB MC 212A. Further, the secure delegator 218 performs Path ORAM accesses to untrusted memory 220A and 220B, e.g., DIMMs, by converting one memory access request from the processor 210 to hundreds of memory accesses to a Path ORAM tree. As previously mentioned, the secure delegator 218 may be triggered by the memory access request transmitted by the first main BOB MC 212A, where the memory access request may include a request for missed data during communication. Upon receipt of the memory access request, the secure delegator 218 may access data saved in the plurality of memory modules using a Path ORAM protocol, prepare a response packet including the missed data, and forwards the response packet to the first simple BOB MC 216A for transmission to the first main BOB MC 212A. Before accessing data saved in the memory modules 220A and 220B, the secure delegator 218 may convert the memory access request to a plurality of memory accesses on a path ORAM tree and then delegate the Path ORAM tree across the secure channel 226A and the non-secure channel 226B so as to balance a space demand for the secure channel. In some examples, such balancing may include reallocating the plurality of memory accesses to a last level of a Path ORAM tree node set for the secure channel to the non-secure channel.

The D-ORAM 140 may maintain the TCB 228 as small as possible by including in the TCB 228 the processor 210 and the secure delegator 218 only. This results in upgrading only one channel into the secure channel 226A, thereby reducing resource overhead and a number of potential exposures to the attackers. The TCB 228 may be kept small also by keeping the size of the secure delegator 218 small. For example, the secure delegator 218 including the stash, encryption logic, etc. may occupy less than 1 $mm^2$ die area using a 32-nanometer technology node. In addition, by leveraging the BOB architecture, D-ORAM 140 may be easily integrated into the mainstream servers using untrusted memory modules, e.g., DIMMs. As such, a major difference between the D-ORAM 140 and the secure memory model is that the D-ORAM 140 does not include the plurality of memory modules 220A and 220B in the TCB 228. Thus, even though the secure delegator 218 is physically integrated with an on-board BOB unit, e.g., a simple BOB MC, the BOB components, e.g., the controller logic and a queue buffer, do not need protection. As such, the address and command buses which connect the simple BOB MCs 216A and 216B and the memory modules 220A and 220B may transmit cleartext data. Such setting matches the wide adoption of untrusted commodity DIMMs, which require cleartext addresses and device commands with timing following the JEDEC standard, in server settings.

Figure 3:
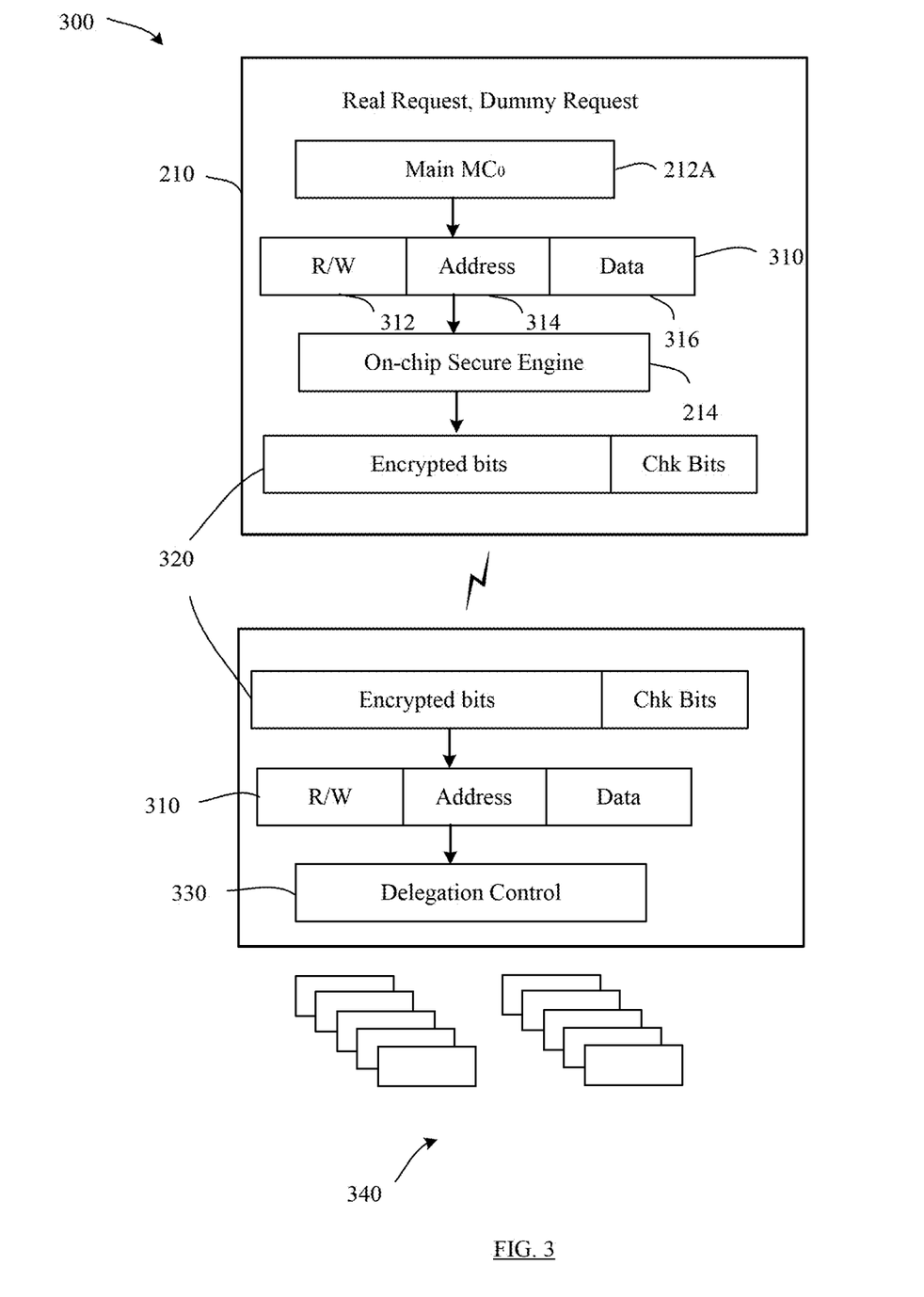
FIG. 3 is a schematic diagram of a D-ORAM memory access operation according to one particular, non-limiting exemplary embodiment of the disclosed concept.

FIG. 3 is a schematic diagram of D-ORAM memory access operation 300 according to one particular, non-limiting exemplary embodiment of the disclosed concept. The D-ORAM memory access operation 300 may be performed mainly by D-ORAM secure components, e.g., the first main BOB MC 212A, the secure engine 214, and the secure delegator 218. In general, the first main BOB MC 212A determines whether there is a cache miss during communications, e.g., search applications, read applications, write applications, etc. When it is determined that there is a cache miss, the first main BOB MC 212A may generate a memory access request 310 including a request for missed data. The memory access request 310 may be 72-bytes (B) long and include three fields, e.g., a one-bit access type field 312, a 63-bit memory address field 314, and a 512-bit data field 316. In some examples, the D-ORAM 140 may attach a 64B long data field 316 to the memory access request packet 310 such that a read request may be non-distinguishable from a write request, thereby helping to prevent potential information leakage from the access type field 312. In some examples, the memory access request 310 for a read request may include the data field 316 containing dummy bits, e.g., all zero bits. In some examples, the D-ORAM 140 may generate, in addition to the real memory access request 310, a dummy access request to prevent timing channel attack. That is, the secure engine 214 may generate a new Path ORAM request every t cycles after the first main BOB MC 212A has received a response packet from the secure delegator 218, where t is an integer, e.g. 50. If, however, there is no real memory access request received by the first main BOB MC 212A after t cycles, the secure engine 214 may generate a dummy memory access request and the first main BOB MC 212A may transmit the dummy memory access request to the secure delegator 218.

For higher security, the D-ORAM 140 may adopt one-time-pad (OTP) encryption performed by the on-chip secure engine 214. Before program execution, the secure engine 214 embedded in the processor 210 may negotiate with the secure delegator 218 a secret key K and a nounce $N_0$ by adopting the public key infrastructure. Then, the secure engine 214 may generate a 72 byte long OTP memory access request packet 320 using an advanced encryption standard (AES) encryption, and XOR the OTP and the packet as follows:

$$OTP=AES(K,N_0,SeqNum)$$

$$SeqNum=SeqNum+1$$

$$Enc\_Pack=OTP \oplus Cleartext\_Packet \qquad \text{Equation (1)}$$

where the SeqNum is a message sequence number and is reset before execution. From equation 1, the OTP is not data dependent on the content of the transmitted packet, and thus, can be pre-generated. Processing one Path ORAM takes long time as it may need to finish hundreds of memory accesses to the Path ORAM tree, while only two OTPs for processor/secure delegator communication are requested. As such, the overhead for generating OTP encryption is negligible. In addition, the OTP memory access request packet 320 may undergo authentication and integrity check. The first main BOB MC 212A then transmits the OTP memory access request packet 320 to the secure delegator 218.

The secure delegator 218 may then receive the OTP memory access request packet 320 from the first main BOB MC 212A, and decrypts the OTP memory access request packet 320 and obtains the original memory access request 310. The secure delegator 218 then processes the decrypted memory access request 310 and access data stored in the memory modules 220A and 220B to locate the missed data by performing delegation control 330. For delegation control 330, the secure delegator 218 may convert the decrypted memory access request 310 to a plurality of memory accesses on a Path ORAM tree, and delegate the Path ORAM tree across the secure channel 226A and the non-secure channels 226B. The secure delegator 218 may consult a position map to locate a path along which the missed data is saved, read all data blocks 340 from the first path, remap a data block including the missed data to a second path, save the remapped data block in a stash, reencrypt other data blocks along the second path, and write at least one of the other data blocks and the remapped data block back to the plurality of memory modules. The delegation control 330 is further explained in detail with respect to FIG. 4. After completion of the delegation control 330, the secure delegator 218 prepares a response package including the missed data and forwards to the first simple BOB MC 216A for transmission to the first main BOB MC 212A. By utilizing Path ORAM and OTP encryption, the D-ORAM 140 may enhance a baseline memory access request packet preparation in a BOB architecture to prevent information leakage.

Figure 4:
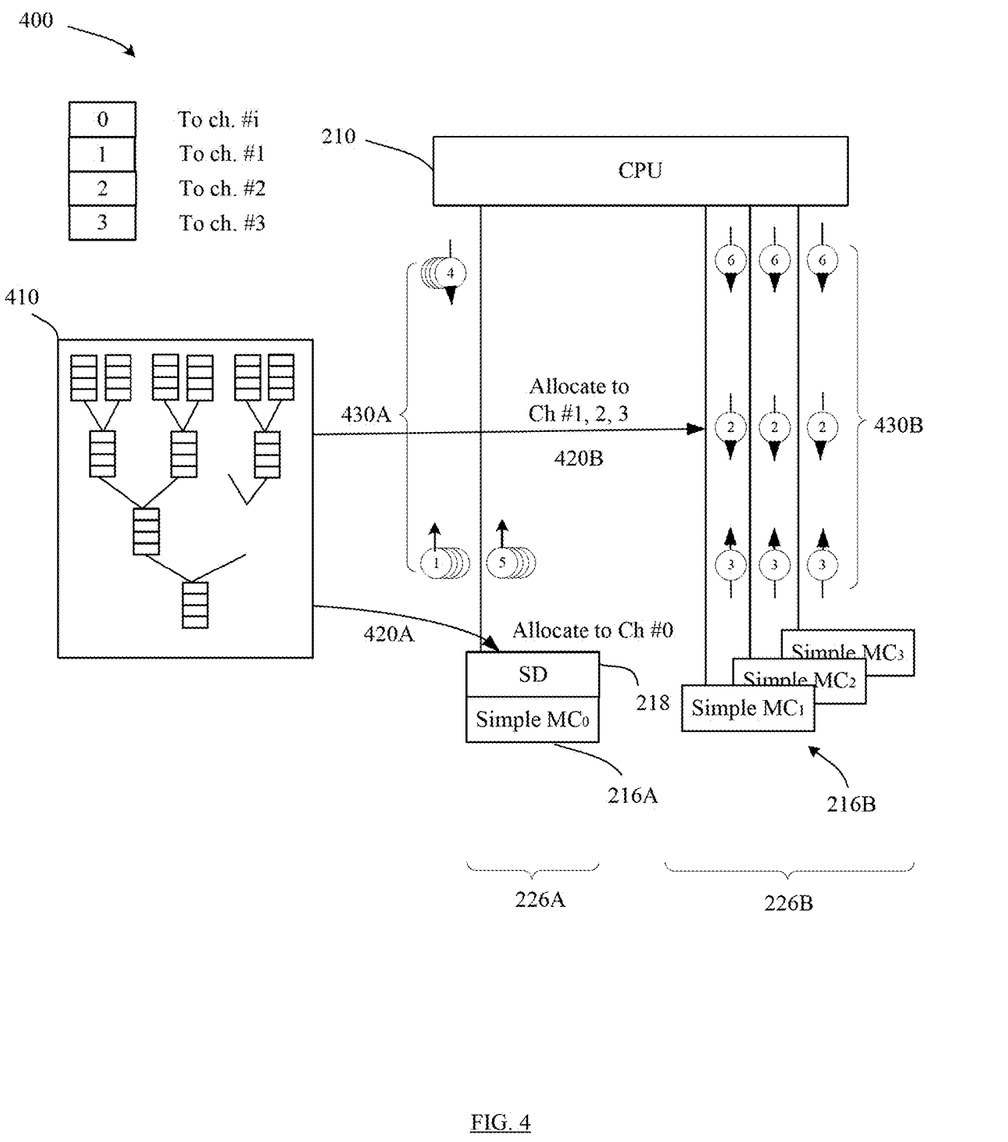
FIG. 4 is a schematic diagram of Path ORAM splitting according to one particular, non-limiting exemplary embodiment of the disclosed concept.

FIG. 4 is Path ORAM splitting 400 according to one particular, non-limiting exemplary embodiment of the disclosed concept. The Path ORAM splitting 400 may be performed by the secure delegator 218. In general, an S-App (secure application) which uses Path ORAM tree may need more space than granted at the channel #0 226A, and thus,
the D-ORAM 140 may use available space in other memory channels, e.g., channels 1, 2, and 3 226B to help with space overflow problem at the secure channel 226A. For the space reallocation, the Path ORAM tree 410 can be extended with additional leaf nodes and these leaf nodes can be allocated on normal channels, e.g., channels 1, 2, and 3, 226B, as shown by the arrow 420B. When there is a path operation, blocks 430A and 430B from channels 0, 1, 2, and 3 will be brought to the secure delegator 218 for decryption and then follow ORAM operation. When the block of the interest is found, the blocks on the path is encrypted again and sent back to channels 1, 2, and 3 226B accordingly. In summary, the Path ORAM splitting 400 is performed as follows: (i) the secure delegator 218 first initiates blocks read on the path residing in channels 1, 2, and 3 226B; (ii) the secure delegator 218 sends an initialization message the channels 1, 2, and 3 226B; (iii) the channels 1, 2, and 3 226B return blocks on the path to the secure delegator 218; (iv) the secure delegator 218 decrypts and encrypts the returned block; and (v) the secure delegator 218 sends the encrypted block back to the CPU 210, and then to channels 1, 2, and 3 to be written back to the memory DIMMs.

In an example using one secure application (S-App) and one or more non-secure applications (NS-Apps), the operating system may allocate space from all four channels 226A and 226B to the NS-Apps and space from the secure channel 226A to the S-App. In particular, the S-App builds a Path ORAM tree covering 4-gygabytes (GB) memory space, and each tree node contains four blocks (i.e., cache lines) that are distributed to four sub-channels controlled by the first main BOB MC 212A In some examples, the secure channel 226A may include four sub-channels, which provide roughly the same bandwidths for an S-App as the Path ORAM trees adopting four on-chip MCs for four parallel channels. In such cases, the Path ORAM can utilize close to the peak memory bandwidth of each channel or sub-channel. However, such default configuration may potentially run into space allocation problem. To prevent tree path overflow, a critical exception that fails the protocol, Path ORAM sets the space efficiency to be around 50%. That is, a 4 GB tree needs to be built for 2 GB user data. In an example where two S-Apps and two NS-Apps are running in the D-ORAM 140, the two NS-Apps could have their data spread across all four channels but the two S-Apps allocate all their data in the secure channel 226A. Therefore, the secure channel 226A tends to be under a memory capacity pressure. To effectively resolve such pressure on the secure channel 226A, the D-ORAM 140 balances the space demand by expanding the Path ORAM tree across channels as shown in FIG. 4.

As shown in FIG. 4, the nodes in the last level of the Path ORAM tree 410 may account for around 50% space—there are $2^L$ nodes in level L and ($2^L-1$) nodes in total from level 0 to level L−1. The two nodes sets may be denoted as S and S2, respectively. Given one path that contains L+1 nodes including the root node (level 0), 1 node from set S1 and L nodes from set S2 may be accessed. Because of the imbalanced accesses to the tree node sets, the D-ORAM 140 may relocate the last k levels to other channels, e.g., normal channels or non-secure channels 226B, to balance the space demand across the channels. Since each tree node contains four data blocks, these data blocks may be distributed to channels #i, #1, #2, and #3, respectively, where i=(path_id mod 3)+1. That is, the nodes have their first blocks alternatively allocated in three normal or non-secure channels 226B. Such space allocation may result in each channel saving 25% of data blocks of the path tree 410.

To conduct Path ORAM protocol under the optimized data allocation, the secure delegator 218 and the on-board first simple BOB MC 216A transmit explicit requests to access the k nodes (or 4k data blocks) from the last k levels. For simplicity, the secure delegator 218 sends out 4k read packets to explicitly ask for the blocks from the other three normal or non-secure channels 226B. In this case, the read packets may be short packets with data field omitted for safety because the optimization is well known such that the message types at this step are also known to attackers. The response packets each may be 72B-long. The fetched blocks are first returned to the on-chip main BOB MC 212A and then forwarded to the secure delegator 218 in the secure channel 226A. The data blocks are then updated during the write phase with write requests sent from the secure delegator 218 and forwarded by the first simple BOB MC 216A. In this optimization example, there is no need to upgrade the normal or non-secure channels 226B into secure channels. Given that the contents saved in the path tree 410 are encrypted and optionally authenticated for higher level security, the normal or non-secure channels 226B cannot derive private information from the access. Neither the read request packet nor the response packet demand additional encryption—the read packet can be sent in cleartext while the response packet contains the fetched data (already ciphertext) from the memory DIMMs 220A and 220B. However, there may be an overburdening of the serial links 224A and 226B with extra messages. For example, when k=2, the D-ORAM 140 sends 8 extra short read packets to the processor 210 and 8 response packets to the secure delegator 218 on channel #0, and 2 to 4 read and response packets on each normal or non-secure channel. That is, the secure channel 226A may receive 24 extra messages while each normal or non-secure channel may receive 6 to 12 extra messages.

Further, to alleviate the contention on the secure channel 226A, the data allocation of NS-Apps may be adjusted and fewer NS-App requests may be directed to the secure channel 226A. That is, the number of NS-Apps that use the secure channel 226A may be adjusted. By reducing the number of NS-Apps that can use the secure channel 226A, channel #0 226A may become less congested. However, if most NS-Apps use normal or non-secure channels 226B, the overall performance may become sub-optimal due to bandwidth contention on normal channels 226B. As such, an optimum allocation threshold may be found by profiling the application's channel access latency. For example, if the ratio of $T_{25mix}$ to $T_{33}$ is greater than 1, the secure channel 226A is slow to handle more traffic from NS-App, and if the ratio is less than 1, it may be better to fully utilize all channels to handle traffic from NS-Apps, where $T_{25mix}$ is the average memory access latency slowdown when NS-Apps use all four channels and the S-App uses the secure channel 226A and $T_{33}$ is the average memory access latency slowdown when NS-Apps use the three normal or non-secure channels 226B but not the secure channel 226A, i.e., each channel has 33% traffic.

Figure 5:
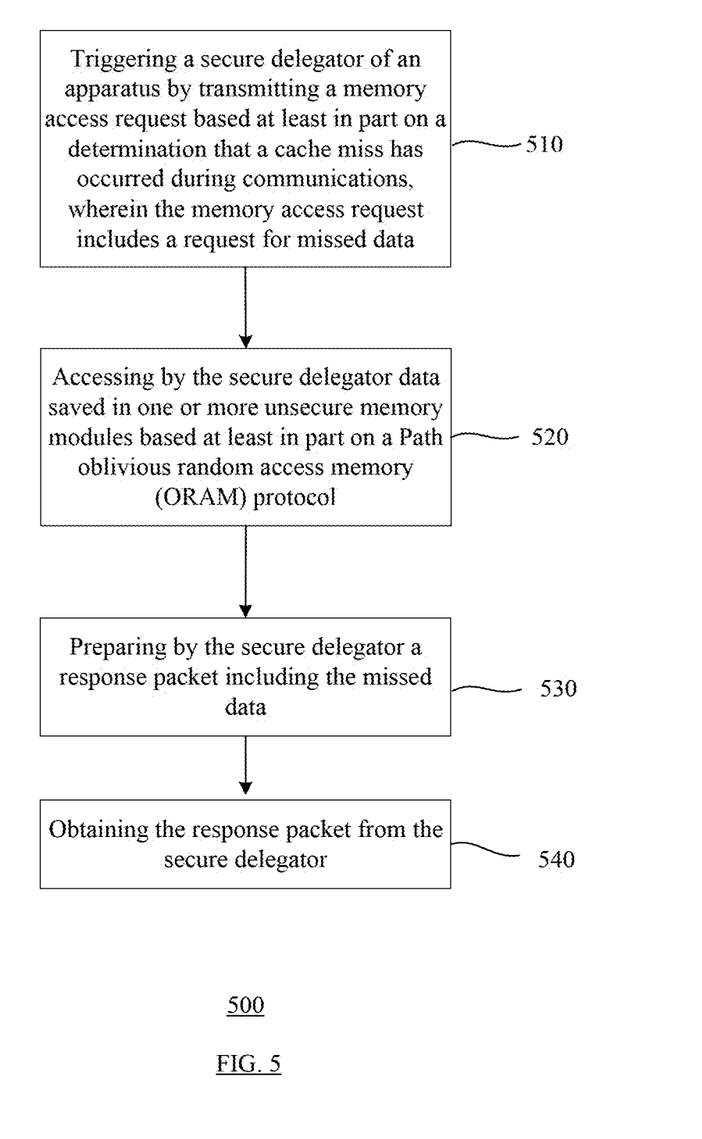
FIG. 5 is a flowchart for a method for providing secure communication according to one particular, non-limiting exemplary embodiment of the disclosed concept.

FIG. 5 is a flow chart for a method 500 for providing secure communication according to one particular, non-limiting exemplary embodiment. The method 500 may be performed by any device or apparatus (e.g., cloud server 120 in FIG. 1) that incorporates the D-ORAM 140 in accordance with the present disclosure.

At 510, the first main BOB MC 212A triggers the secure delegator 218 of an apparatus by transmitting a memory access request based at least in part on a determination that a cache miss has occurred during communications, where the memory access request includes a request for missed data.

At 520, the secure delegator 218 accesses data saved in one or more unsecure memory modules based at least in part on a Path ORAM protocol. In some examples, the accessing data saved in the one or more unsecure memory modules may include converting the memory access request into a plurality of memory accesses on a Path ORAM tree, and delegating the Path ORAM tree across memory channels including a secure channel and one or more non-secure channels of the D-ORAM 140. In some cases, the delegating the Path ORAM tree may include balancing a space demand for the secure channel 226A by reallocating the plurality of memory accesses to a last level of a Path ORAM tree node set for the secure channel 226A to the one or more non-secure channels 226B. In some examples, the delegating the Path ORAM tree may also include consulting by the secure delegator 218 a position map to locate a first path along which the missed data is saved, reading by the secure delegator 218 all data blocks from the first path, remapping by the secure delegator 218 a data block including the missed data to a second path, saving by the secure delegator 218 the remapped data block in a stash, reencrypting by the secure delegator 218 other data blocks along the second path, and writing by the secure delegator 218 at least one of the other blocks and the remapped data block back to the unsecure memory modules 220A and 220B.

At 530, the secure delegator 218 may prepare a response packet including the missed data. The data field of the response packet may include dummy bits if the memory access request from the main BOB MC 212A was a write request. The response packet may then be encrypted and include checked bits. The secure delegator 218 may forward the response packet to the first simple BOB MC 216A, which in turn transmits the encrypted response packet to the first main BOB MC 212A.

At 540, the first main BOB MC 212A may obtain the response packet from the secure delegator 218. The processor 210 may then check the response packet and decrypt the response packet to get the requested data for the read request or finish for the write request.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An apparatus, comprising:
a processor including a plurality of main buffer on board (BOB) memory controllers (MCs) and a secure engine coupled to a first main BOB MC of the plurality of main BOB MCs;
a plurality of simple BOB MCs, wherein a first simple BOB MC of the plurality of simple BOB MCs is coupled to the first main BOB MC by a first serial link and a second simple BOB MC of the plurality of simple BOB MCs is coupled to a second main BOB MC of the plurality of main BOB MCs via a second serial link;
a secure delegator arranged between the processor and the first simple BOB MC and electrically coupled to the first main BOB MC and the first simple BOB MC, wherein the secure delegator, the first main BOB MC and the secure engine create a secure channel, and the second simple BOB MC and the second main BOB MC create a non-secure channel; and
a plurality of memory modules coupled to each of the plurality of simple BOB MCs by a parallel link;
wherein the plurality of main BOB MCs, the secure engine and the secure delegator are provided within a trusted computing base (TCB) of the apparatus and the plurality of simple BOB MCs and the plurality of memory modules are provided outside the TCB; and
wherein the secure engine is structured and configured to facilitate cryptographic operations, and the secure delegator is structured and configured to: (i) secure communication between the first main BOB MC and the secure delegator, and (ii) perform Path ORAM accesses to the plurality of memory modules.

2. The apparatus according to claim 1, wherein the secure engine is further structured and configured to receive Path ORAM primitives and reduce contention for access to one or more memory buses outside of the TCB.

3. The apparatus according to claim 1, wherein the plurality of simple BOB MCs each comprise control logic and data buffers.

4. The apparatus according to claim 1, wherein the secure delegator is further structured and configured to:
receive a memory access request from the first main BOB MC, the memory access request including a request for missed data during communications;
access data saved in one or more memory modules of the plurality of memory modules based at least in part on a Path ORAM protocol; and
prepare a response packet including the missed data for transmission to the first main BOB MC.

5. The apparatus according to claim 4, wherein memory access request comprises at least one of a real memory access request and a dummy memory access request comprising one or more zero bits.

6. The apparatus according to claim 4, wherein the secure delegator is further structured and configured to:
convert the memory access request to a plurality of memory accesses on a Path ORAM tree; and
delegate the Path ORAM tree across the secure channel and the non-secure channel.

7. The apparatus according to claim 4, wherein the secure delegator is further structured and configured to:
consult a position map to locate a first path along which the missed data is saved;
read all data blocks from the first path;
remap a data block including the missed data to a second path;
save the remapped data block in a stash;
reencrypt other data blocks along the second path; and
write at least one of the other data blocks and the remapped data block back to the plurality of memory modules.

8. The apparatus according to claim 4, wherein the secure delegator is further structured and configured to balance a space demand for the secure channel by reallocating the plurality of memory accesses to a last level of a Path ORAM tree node set for the secure channel to the non-secure channel.

9. The apparatus according to claim 1, wherein the secure engine is further structured and configured to generate a Path ORAM request after a predetermined period starting at a time of receipt of a memory access request from the first main BOB MC.

10. The apparatus according to claim 1, wherein the secure engine is further structured and configured to negotiate with the secure delegator at least one of a secret key and a nounce based at least in part on a public key infrastructure.

11. The apparatus according to claim 10, wherein the secure engine is further structured and configured to encrypt a memory access request based at least in part on one-time-pad (OTP) encryption.

12. The apparatus according to claim 1, wherein the first main BOB MC is structured and configured to trigger the secure delegator by transmitting a memory access request to the secure delegator based at least in part on a determination that a cache miss has occurred during communications.

13. The apparatus according to claim 1, wherein the plurality of simple BOB MCs each are structured and configured to generate and transmit device commands and enforce timing constraints for the apparatus.

14. The apparatus according to claim 1, wherein the parallel link includes an address bus and a command bus that are structured and configured to transmit cleartext data.

15. The apparatus according to claim 1, wherein the processor is a processor chip and wherein the plurality of simple BOB MCs are provided on a motherboard coupled to the processor chip.

* * * * *